(12) United States Patent
Sorvari et al.

(10) Patent No.: US 7,620,616 B2
(45) Date of Patent: Nov. 17, 2009

(54) TERMINAL APPARATUS, METHOD AND COMPUTER PROGRAM FOR SELECTING A SYMBOL STRING

(75) Inventors: Antti Sorvari, Itäsalmi (FI); Markus Kahari, Helsinki (FI)

(73) Assignee: Nokia Corporation, Espoo (FI)

( * ) Notice: Subject to any disclaimer, the term of this patent is extended or adjusted under 35 U.S.C. 154(b) by 680 days.

(21) Appl. No.: 11/025,374

(22) Filed: Dec. 29, 2004

(65) Prior Publication Data

US 2005/0207656 A1  Sep. 22, 2005

(30) Foreign Application Priority Data

Dec. 30, 2003  (FI)  .................. 20031923

(51) Int. Cl.
*G06F 17/30* (2006.01)
*G06F 7/00* (2006.01)
*G06F 17/00* (2006.01)

(52) U.S. Cl. ............... 707/2; 707/10; 715/703; 715/264; 709/245

(58) Field of Classification Search ............. None
See application file for complete search history.

(56) References Cited

U.S. PATENT DOCUMENTS

| | | | | |
|---|---|---|---|---|
| 4,782,464 A * | 11/1988 | Gray et al. | ........... | 715/259 |
| 5,367,453 A * | 11/1994 | Capps et al. | ........... | 715/531 |
| 5,671,426 A * | 9/1997 | Armstrong, III | ........... | 704/10 |
| 5,786,819 A * | 7/1998 | Weiser et al. | ........... | 715/840 |
| 5,896,321 A * | 4/1999 | Miller et al. | ........... | 365/189.01 |
| 6,008,799 A * | 12/1999 | Van Kleeck | ........... | 345/173 |
| 6,229,532 B1 * | 5/2001 | Fujii | ........... | 715/733 |
| 6,564,213 B1 * | 5/2003 | Ortega et al. | ........... | 707/5 |
| 6,697,483 B1 * | 2/2004 | Saarinen et al. | ........... | 379/354 |
| 6,744,451 B1 * | 6/2004 | Anderson et al. | ........... | 715/841 |
| 6,950,994 B2 * | 9/2005 | Dharap | ........... | 715/864 |
| 7,133,859 B1 * | 11/2006 | Wong | ........... | 707/2 |
| 2002/0116528 A1 * | 8/2002 | Vale | ........... | 709/245 |
| 2003/0067495 A1 * | 4/2003 | Pu et al. | ........... | 345/811 |

FOREIGN PATENT DOCUMENTS

| | | |
|---|---|---|
| EP | 0 777 187 A2 | 6/1997 |
| EP | 0 843 269 A2 | 5/1998 |
| EP | 915604 A2 * | 5/1999 |
| EP | 1 071 258 A1 | 1/2001 |
| EP | 1 130 883 A2 | 9/2001 |
| EP | 0 817 107 B1 | 8/2003 |

* cited by examiner

*Primary Examiner*—Tony Mahmoudi
*Assistant Examiner*—Jacob F Bétit
(74) *Attorney, Agent, or Firm*—Hollingsworth & Funk, LLC

(57) ABSTRACT

The invention relates to a terminal apparatus, comprising: a display, a memory, and a user interface for receiving a sample string including one or several symbols. In order to achieve a user-friendly solution for selecting a symbol string the terminal apparatus is configured to: retrieve, from said memory symbol strings with a first part that matches with a sample string and to display the retrieved symbol strings on said display such that if the group of symbol strings includes an identical first part, then at least for these symbol strings only the first part is displayed and only once, display on said display, in response to a user selection via said user interface, information relating to those retrieved symbol strings which have an identical first part with the user selected symbol string, and receive, via said user interface, a second user selection identifying a selected symbol string.

11 Claims, 4 Drawing Sheets

TERMINAL APPARATUS, METHOD AND COMPUTER PROGRAM FOR SELECTING A SYMBOL STRING

BACKGROUND OF THE INVENTION

1. Field of the Invention

This invention relates to a solution for selecting a symbol string from among a plurality of optional symbol strings. In the following the invention will mainly be explained in connection with selecting a link from among a plurality of available links, though it should be understood that the present invention can also be used for other purposes.

2. Description of Prior Art

Previously there are known Internet browsers, which keep track of the addresses the user has visited. In these solutions the browser includes a history menu, where the visited addresses are listed as symbol strings. If the user wants to visit a specific address for a second time, then the user can make a selection via a user interface in order to indicate one of the symbol strings in the history list as selected. The browser is responsive to such a selection. When the selection has been made, the browser starts to load data from the selected host and destination.

A problem with prior art solutions of the above described type is that each time the user visits a new address, this new address is added to the list. In practice, the list becomes rather long with time. The list of symbol strings, which include the complete address to specific destinations (files or pages) at specific hosts, is not very clear, and often the user has to spend a lot of time looking at the list before a specific desired address is found.

Another problem with the prior art solutions is that the existing solutions for displaying the available symbol strings for the user is not very well suited for small displays. Occasionally the length of the symbol strings, for instance the Internet addresses, are too long to be completely displayed on a small display. Such displays can typically be found on mobile stations of cellular radio systems and other handheld portable terminal apparatuses.

SUMMARY OF INVENTION

An object of the present invention is to solve the above mentioned drawback and to provide a solution which improves the user-friendliness such that the user can select a desired symbol string more easily and quickly than before.

Another object of the present invention is to provide a solution which improves the possibility to properly display symbol strings of a considerable length to a user, even though the width of the used display is rather narrow.

Still another object of the present invention is to provide a solution which makes it possible for the user to quickly and easily select a desired symbol string from among a plurality of symbol strings by using a limited user interface, such as a keypad with multifunctional character keys.

The above mentioned and other objects of the present invention are achieved with a terminal apparatus, with a method, with a computer readable carrier, and with a computer program.

In the present invention data is retrieved from a memory in order to display the data as symbol strings for the user. It is not necessary to have the data stored in the memory as symbol strings, but any prior art structure for storing data can be used. The retrieved data is although displayed for the user as symbol strings. In the present invention these strings can be logically divided into at least two parts, such as host/destination or surname/firstname, depending on the implementation.

In order to make the presentation of the available symbol strings more user-friendly, the retrieved symbol strings are at first displayed for the user such that at least for those symbol strings, that have an identical first part, only the first part is displayed and only once. This reduces the number of symbol strings which the user has to study on the display, and it also shortens the length of the symbol strings, as many of the symbol strings are shown only in part. When the user has selected from the display one of the symbol strings, then in a second phase information is displayed about all those symbol strings which have an identical first part with the selected symbol string.

The above described hierarchical solution for displaying the symbol strings improves significantly the user-friendliness, because the number of symbol strings displayed at once on the display is reduced. Also the length of the displayed symbol strings can be reduced, which makes the solution especially well suited for terminal apparatuses with a small (narrow) display.

In a preferred embodiment of the invention a statistic is compiled about the most frequently selected symbol strings by storing information in a memory each time a symbol string is selected for use. This makes it possible to display the retrieved symbol strings on the display by taking into account said statistics, such that the symbol strings are displayed in order of relevance as indicated by said statistics. Thus the symbol string which has (recently) been selected most frequently can be displayed on the first place of the list, which makes it easy for the user to find it.

The preferred embodiments of the terminal, the method and the computer program according to the present invention are disclosed in the dependent claims.

BRIEF DESCRIPTION OF DRAWINGS

In the following the present invention will be described in closer detail by way of example and with reference to the attached drawings, in which.

DESCRIPTION OF PREFERRED EMBODIMENTS

In the following the operation of a terminal apparatus according to the present invention will be explained with reference to FIGS. 1A to 1C.

Figure 1A:
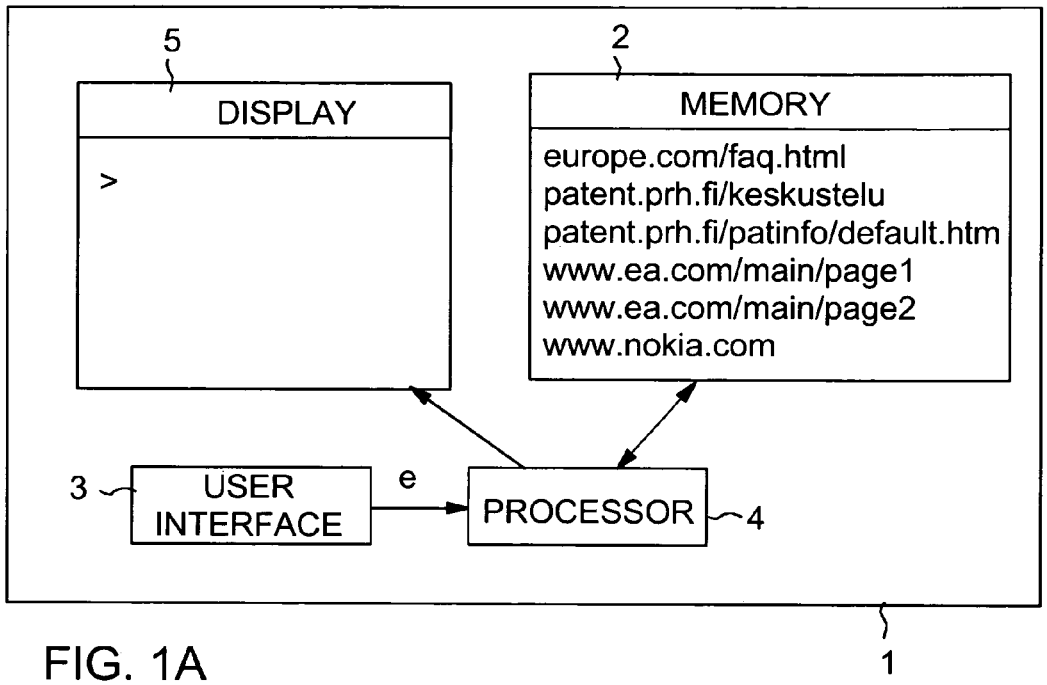
FIGS. 1A to 1C illustrate a first preferred embodiment of a terminal apparatus according to the present invention.

FIG. 1A shows a terminal apparatus 1, which by way of example is assumed to be a mobile station of a cellular radio system. Such a mobile station can be, for instance, a mobile telephone, a media terminal, or a PDA (Personal Data Assistant). It should, however, be observed that the present invention can be implemented also on other terminal apparatuses such as on PC:s (Personal Computer) or on a laptop computers.

The memory 2 of the terminal apparatus 1 contains data about the Internet addresses which have previously been selected for use with the terminal apparatus 1. The addresses can be stored in the memory by using any suitable data structure. However, the addresses are displayed for the user on the display as symbol strings, and therefore it is assumed by way of example that the addresses have also been stored in the memory 2 as symbol strings. The memory 2 also contains information about how frequently the user has selected for use the respective addresses.

When the user decides to visit an Internet address by using a browser application of the terminal apparatus, the user activates the browser application via the user interface 3 by feeding a user input. The processor 4 identifies the user input as an activation command and carries out the actual processing needed for activating the browser.

If the user has entered a user input which does not include a sample string, the processor can, depending on the implementation, retrieve all symbol strings stored in the memory 2 and display them on the display 5. Alternatively the processor can only activate the browser application and after that remain waiting until the user enters a sample string via the user interface 3.

In FIG. 1A it is assumed that the user input includes also a sample string, which in this case consists of only one symbol, which is the symbol "e". As a response to this user input, the processor 4 reads through the content of the memory 2, and for each symbol string, carries out a test to see if the first part of the symbol string matches at least partly with the sample string.

In FIG. 1A the symbol strings consist of Internet addresses, which can logically be divided into a first part and a second part. The first part of each symbol string identifies the host, such as "europe.com", "patent.prh.fi", "www.ea.com" and "www.nokia.com". The first part of the address may also include a prefix, such as "http://" which is not shown in the figure. In some implementations it is also possible to display the first part of each symbol string only in part. For instance, if the beginning of the first parts are identical (such as www-.wap), it is sufficient to leave this beginning out and to display only the remaining part of the first part. However, when the user selects such a string for use and the string by way of example is an address to an Internet page, then the complete string is used for opening the Internet page.

The second part of each symbol string consist of the remaining portion, in other words the destination (page or file) at the named host, such as: "/faq.html", "/keskustelu", and "/patinfo/default.htm".

The testing whether or not the sample string matches with the first part of a string is done by comparing the symbols at the beginning of the first part and by comparing the symbols after the first "." in the first part with the sample string. When the sample string is "e" and the symbol strings are as shown in FIG. 1A, then a match is found for three symbol strings:

"www.ea.com/main/page1",
"www.ea.com/main/page2", and
"europe.com/faq.html".

Two of these symbol strings have an identical first part. The terminal apparatus therefore groups together these symbol strings and displays them only in part. According to the present invention only the first part of these two symbol strings are displayed on the display. The symbol strings can be displayed in alphabetical order. However, preferably, the symbol strings are displayed in an order of relevance. FIG. 1B illustrates how the symbol stings are displayed.

Figure 1B:
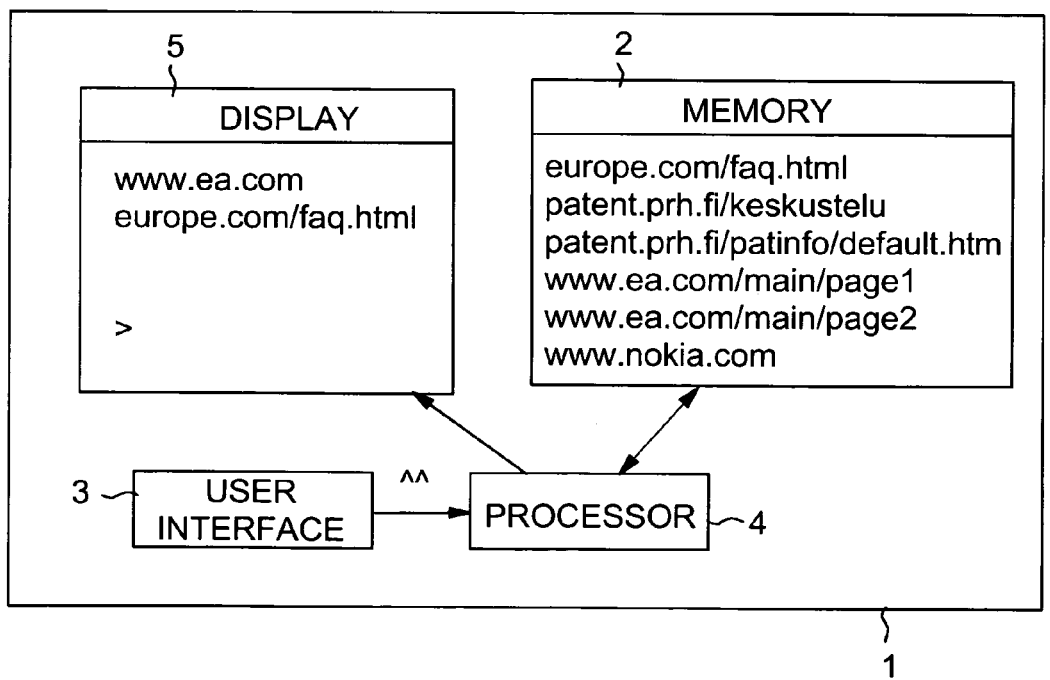

In FIG. 1B it is assumed, by way of example, that the terminal apparatus has visited destinations within the host "www.ea.com" more frequently than within the host "europe-.com". Therefore "www.ea.com" is shown on the top of the list (as the most relevant symbol string). In this example it is assumed that the symbol string "europe.com/faq.html" is shown completely already at this stage, because only one destination within "europe.com" has been previously visited.

As an alternative, it is naturally also possible that this symbol string is shown only in part, in which case the first part "europe.com" is shown.

When the user has studied the symbol strings displayed on the display 5 of FIG. 1B, the user feeds a user selection via the user interface 3. In this case the user can complement the sample string by feeding new symbols, in which case the processor 4 clears the display, carries out a new round of matching between the symbol strings and the sample string, and displays on the display 5 only those symbol strings (or parts of the symbol strings) which at least partly match with the new sample string. In FIG. 1B it is, however, assumed that the user makes a selection by moving the cursor by pressing arrow up twice "^^" and by then pressing ENTER. Thus the cursor moves to the symbol string "www.ea.com", which is selected.

In FIG. 1B and in the above explanation it is by way of example assumed that the most relevant symbol string is shown on the top of the display and that the user has to press arrow up twice to select this symbol string. This is naturally only one possible implementation. An other is to display the most relevant string at the bottom of the display immediately above the cursor, in which case it is sufficient to press arrow up only once to select this symbol string. Still a third alternative is to have the cursor on the top of the display and to display the most relevant symbol string immediately below the cursor, in which case the user presses once arrow down to select the most relevant symbol string.

The processor 4 clears the display 5 as a response to the selection, and carries out a search in order to identify all symbol strings which have an identical first part with the selected symbol string "www.ea.com". Information relating to the identified symbol strings are then displayed on the display 5 as shown in FIG. 1C. In FIG. 1C it is assumed that the display displays the the host "www.ea.com" separately on top, and the information relating to the identified symbol strings below. In FIG. 1C this information consists of the second parts of the symbol strings, in other words the destinations "/main/page1" and "/main/page2". This has the advantage that the complete symbol string is clear also for a user who uses a terminal apparatus 1 with a relatively narrow display, where the complete symbol string is too long to be displayed completely at once on one line. However, as an alternative to the display shown in FIG. 1C it is also possible to show the symbols strings completely as "www.ea.com/main/page1" and "www.ea.com/main/page2".

Figure 1C:
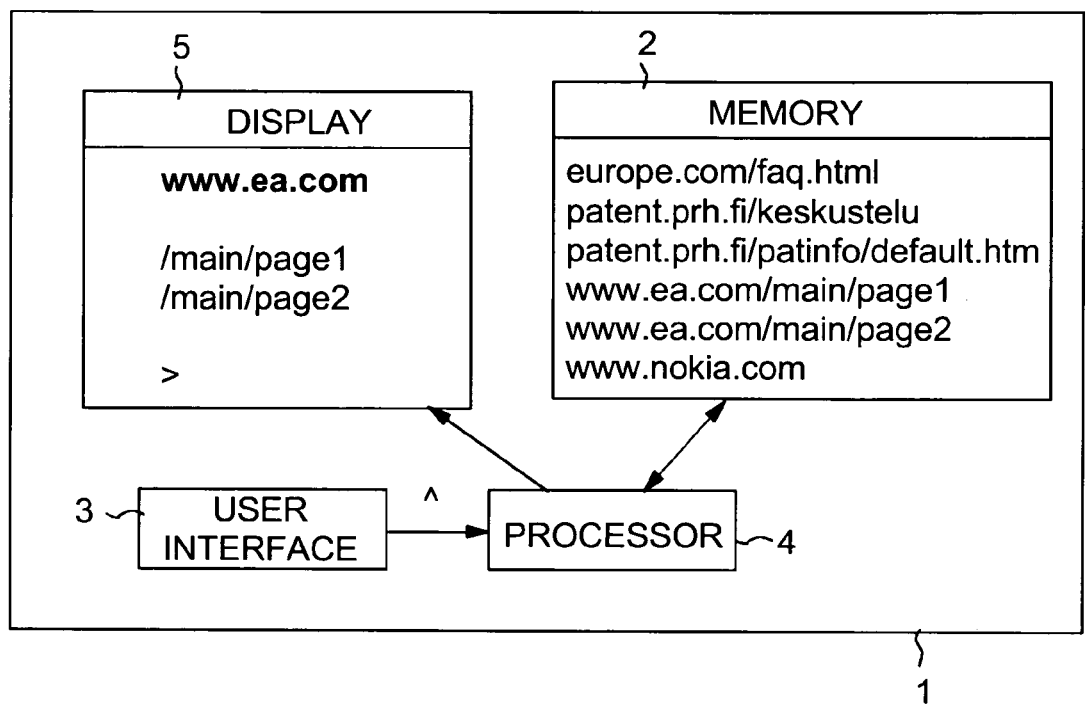

The information relating to the symbol strings which in FIG. 1C consists of the destinations, can in practice also consist of some other information which is stored and retrieved from the memory. One alternative is that this information consists of the heading of the destination (page or file). For instance the Internet address "www.ea.com/main/page2" can have a heading "Contact information" which is then shown instead of "/main/page2".

In the situation of FIG. 1C the user is assumed to enter a selection via the user interface 3, which consists of an arrow up "^" and ENTER. Thus the cursor moves to the text "/main/page2" and the complete selected string is "www.ea.com/main/page2". The processor 4 feeds this string to the browser application, which displays the selected Internet page for the user on the display 5. As a response to the selection, also the statistics on selected strings is updated by storing in the memory 2 information indicating the selected symbol string (provided that such an optional feature is in use).

The user can also be given an opportunity to change the selected symbol string before the symbol string is fed to the browser application. Thus the user can, for instance, move the cursor to "/main/page2" as explained before, press backspace once (to delete "2"), press "3" once and the ENTER. In this case the selected symbol string is www.ea.com/main/page3, and this symbol string is fed to the browser application.

As an alternative to the implementation shown in FIG. 1C the cursor can be automatically located at the most relevant symbol string when the information relating to the identified symbol strings (such as the second parts of the symbol strings) are displayed on the display. In this case it is sufficient for the user to only press ENTER if the user decides to select the most relevant symbol string.

In the previous explanation it has been assumed by way of example that the displayed symbol strings are Internet addresses. However, the present invention can be used also in connection with other symbol strings, such as for instance phone book entries or email addresses. In the case of phone book entries or email addresses the first parts of the symbol strings can consist of the surnames of the persons and the second parts of the first names of the persons.

The present invention can also be implemented such that the user is given the opportunity to continue to enter symbols via the user interface, and the sample string consisting of the entered symbols is continuously compared with the symbol strings in the memory (in a first stage with the first parts of the symbol strings and in a second stage with the second parts of the symbol strings). In this case the display is continuously updated such that after each new entered symbol, only those symbol strings (or parts of symbol strings) which match with the entered sample string are shown on the display.

Figure 2:
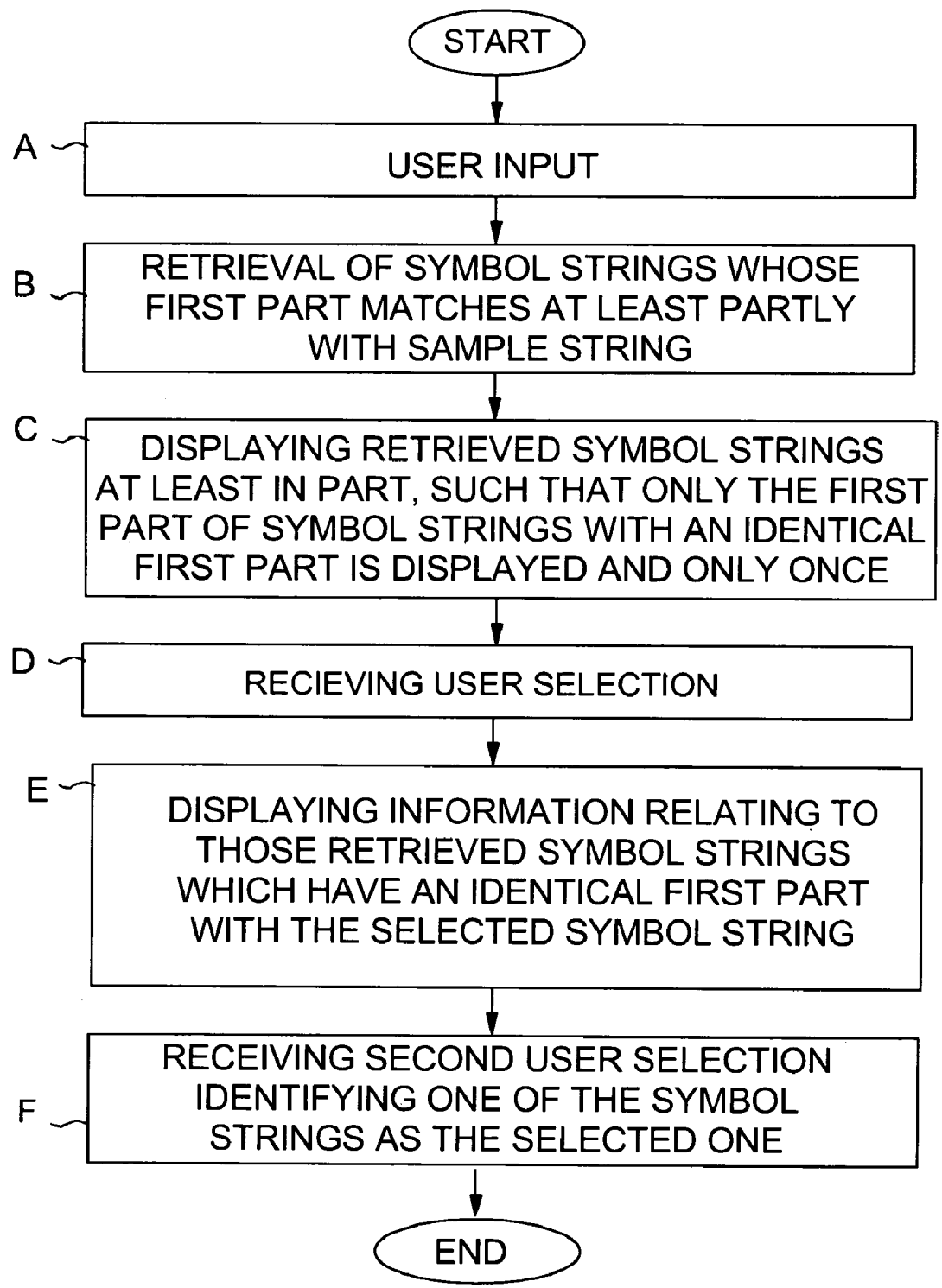
FIG. 2 is a flow chart of a first preferred embodiment of the method according to the present invention.

FIG. 2 illustrates a first preferred embodiment of a method according to the present invention. In practice, the method can be implemented with a software installed in a terminal equipment.

In block A a user input is received. This user input includes at least a command which indicates that symbol strings should be retrieved from a memory. The user input may include also a sample string which consists of one or several symbols.

In block B symbol strings whose first part matches with the sample string are retrieved from the memory. In case the user input did not include any sample string, then all symbol strings can be retrieved.

In block C the retrieved symbol strings are displayed at least in part. In case several symbol strings with an identical first part should be displayed, then it is sufficient to display only the first part of these symbol strings and only once. Other symbol strings, such as symbol strings with a unique first part which does not correspond to the first part of any other symbol string, are displayed as whole or alternatively in part (preferably the first part).

In block D a user selection is received. This user selection identifies one of the symbol strings displayed at least in part on the display as a selected symbol string.

In block E information relating to those symbol strings whose first part corresponds with the selected symbol string are selected. Information relating to the selected symbol strings is displayed. This information can consist of the complete symbol strings (first part and second part), the remaining part of the symbol strings (the second part of the symbol strings), or of any other information which is available and relates to the selected symbol strings. Such other information may consist, for instance in the case of Internet addresses, of the title of the destination page to which the complete symbol string relates.

In block F a second user selection is received. This second user selection identifies one of the displayed symbol strings as the selected one. Depending on the implementation, the selected symbol string can, for instance, be automatically entered into a browser application such that the Internet page corresponding to the selected symbol string is loaded by the browser and presented for the user. Alternatively, in case the symbol string is an entry in a telephone directory, a speech path can automatically be initiated to the telephone number corresponding to the selected symbol string.

Figure 3:
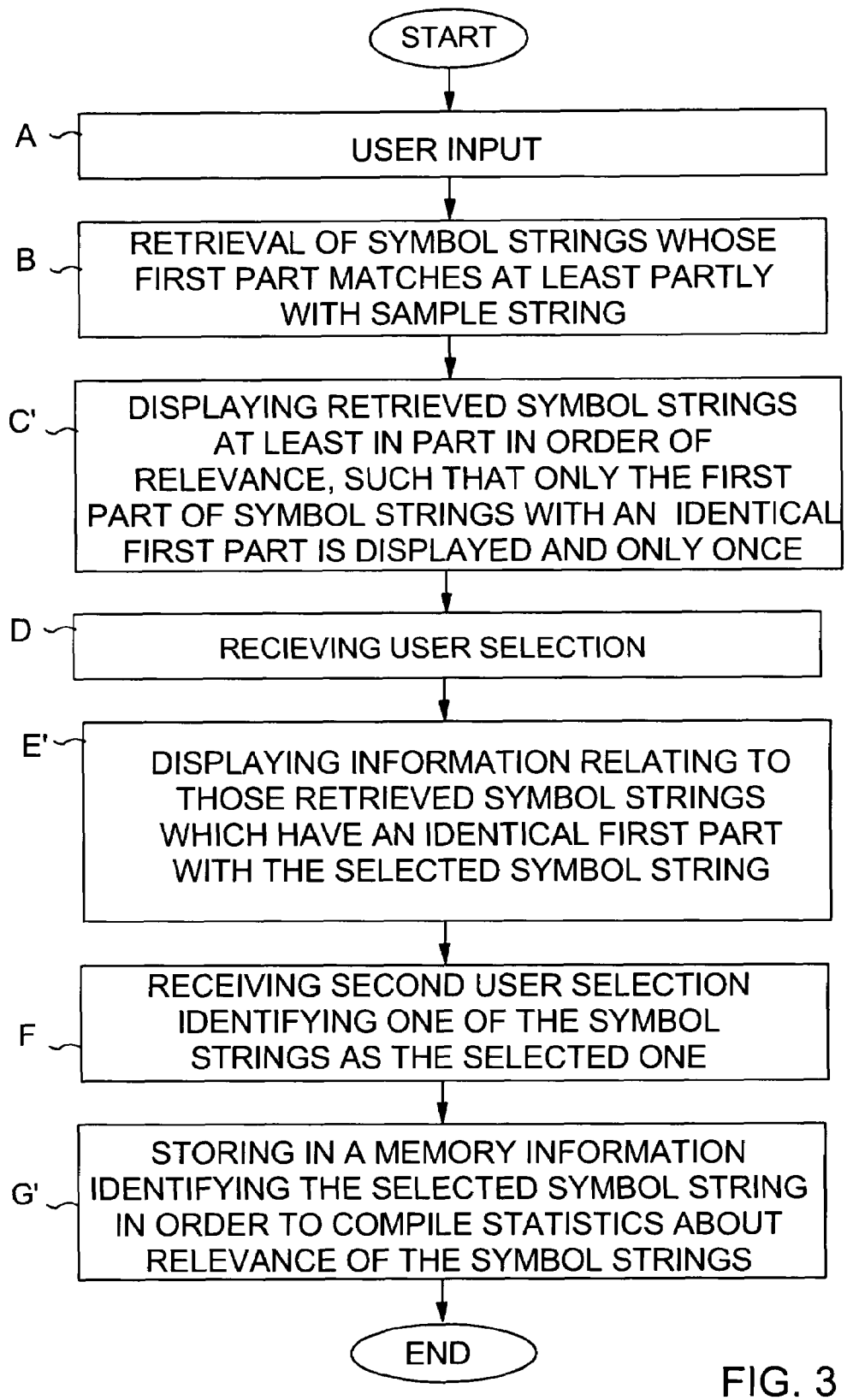
FIG. 3 is a flow chart of a second preferred embodiment of the method according to the present invention.

FIG. 3 illustrates a second preferred embodiment of the method. This embodiment is very similar to the one explained in connection with FIG. 2. Therefore the embodiment of FIG. 3 will in the following be mainly explained with reference to the differences between these embodiments.

In FIG. 3 a statistic is compiled about the most frequently selected symbol strings. Advantageously in this connection information is compiled in the statistics also about how recent the selection for a symbol string is, so that very old selections are not taken into account. This can be achieved, for instance, by storing the time for each selection of a symbol string. In this case, for instance, only selections from a predetermined time period are taken into account when the relevance of the symbol strings is determined. Alternatively, a predetermined number of selections can be stored in the memory, and only these selections are taken into consideration when the relevance of the symbol strings is determined.

When the retrieved symbol strings are displayed at least partly in block C', they are displayed in order of relevance. Thus the most frequently visited symbol string is displayed at the top of the list. The symbol strings can be shown in order of relevance such that the order of all the symbol strings depends on their order of relevance. Alternatively, for instance, only the order of the most relevant symbol strings depends on their relevance, and the remaining strings are shown in some other order, for instance in an alphabetical order.

In an implementation where only the first part of the symbol strings are displayed in block C' and this first part consists of, for instance, the host such as "www.ea.com" where the user has viewed several destinations "\main\page1" and "\main\page2", then the relevance is determined by taking into account the number of times the user has viewed any destination at the host in question. The most frequently visited host is thus on top on the list.

Also in block E the displayed information is displayed in order of relevance such that the information relating to the most frequently selected string is displayed on top of the list.

In block G, when one of the symbol strings has been selected as the selected symbol string, information about this selection is stored in the memory. This makes it possible to compile the statistics which can be used for determining the relevance of the symbol strings.

It is to be understood that the above description and the accompanying Figures are only intended to illustrate the present invention. It will be obvious to those skilled in the art that the invention can be varied and modified also in other ways without departing from the scope of the invention.

What is claimed is:

1. A method comprising:
    receiving a user input,
    retrieving from a memory, as a response to said input, symbol strings whose content can be logically divided into at least a first part and a second part, said retrieving is carried out by retrieving from the memory only symbol strings whose first part matches at least partly with a sample string, if such a sample string including one or several symbols has been received in said user input, wherein said retrieved symbol strings are links whose first part consists of a host name and whose second part consists of a destination in said host, displaying the retrieved symbol strings at least in part on a display such that if the group of retrieved symbol strings includes several symbol strings with an identical first part, then at least for these symbol strings only the first part is displayed and only once, receiving a user selection identifying one of said at least in part displayed symbol strings as selected, displaying on said display information relating to those retrieved symbol strings which have an identical first part with the selected symbol string, wherein said information displayed on said display includes the title of the destination, and receiving a second user selection identifying one of those symbol strings, whose information is displayed on the display, as the selected symbol string.

2. The method as in claim 1, wherein said information displayed on said display includes said second part of the respective symbol strings.

3. The method as in claim 1, wherein said information displayed on said display includes additional information which is retrieved from the memory.

4. The method as in claim 1, wherein said method comprises:

compiling statistics indicating the most frequently selected symbol strings by storing information in a memory each time a symbol string is selected for use, and displaying said retrieved symbol strings at least in part on the display by taking into account said statistics, such that at least the most relevant symbol strings are displayed in order of relevance as indicated by said statistics.

5. A memory having a computer program stored thereon, wherein said computer program is arranged to control a programmable apparatus to:

receive a user input, retrieve from a memory symbol strings whose content can be logically divided into at least a first part and a second part from the memory as a response to said user input, wherein the first part matches at least partly with a sample string, if such a sample string including one or several symbols has been received in said user input, wherein said retrieved symbol strings are links whose first part consists of a host name and whose second part consists of a destination in said host, display the retrieved symbol strings at least in part on a display such that if the group of retrieved symbol strings includes several symbol strings with an identical first part, then at least for these symbol strings only the first part is displayed and only once, receive a user selection identifying one of said at least in part displayed symbol strings as selected, display on said display information relating to those retrieved symbol strings which have an identical first part with the selected symbol string, wherein said information displayed on said display includes the title of the destination, and receive a second user selection identifying one of those symbol strings, whose information is displayed on the display, as the selected symbol string.

6. The memory as in claim 5, wherein the said information displayed on said display includes said second part of the respective symbol strings.

7. The memory as in claim 5, wherein said information displayed on said display includes additional information which is retrieved from the memory.

8. The memory as in claim 5, wherein said computer program is arranged to control a programmable apparatus to:

compile statistics indicating the most frequently selected symbol strings by storing information in a memory each time a symbol string is selected for use, and display said retrieved symbol strings at least in part on the display by taking into account said statistics, such that at least the most relevant symbol strings are displayed in order of relevance as indicated by said statistics.

9. An apparatus, comprising:

a display, a memory, a browser, and a user interface for receiving a sample string including one or several symbols, the apparatus is configured to:

retrieve, as a response to the sample string, from said memory symbol strings whose content can be logically divided into at least a first part and a second part with the first part that at least partly matches with the sample string and to display the retrieved symbol strings at least in part on said display, such that if the group of retrieved symbol strings includes several symbol strings with an identical first part, then at least for these symbol strings only the first part is displayed and only once, wherein said retrieved symbol strings are links whose first part consist of a host name and whose second part consists of a destination in said host, display on said display, as a response to a user selection via said user interface, information relating to those retrieved symbol strings which have an identical first part with the user selected symbol string, and receive, via said user interface, a second user selection identifying one of those symbol strings whose information is displayed on the display, as a selected symbol string, wherein as a response to said second user selection, provide the user of the apparatus access via the browser to the host and destination indicated by the selected symbol string.

10. The apparatus as in claim 9, wherein said apparatus is configured to:

compile a statistics indicating the most frequently selected symbol strings by storing information in the memory each time a symbol string is selected for use, and display said retrieved symbol strings on the display by taking into account said statistics, such that at least the most relevant symbol strings are displayed in order of relevance as indicated by said statistics.

11. The apparatus as in claim 9, wherein said apparatus is a mobile station of a cellular radio system.

* * * * *